(12) United States Patent
Tsujihama et al.

(10) Patent No.: US 8,730,036 B2
(45) Date of Patent: May 20, 2014

(54) MANUFACTURING CONTROL DEVICE

(75) Inventors: Shingo Tsujihama, Hino (JP); Kazuki Saito, Hino (JP)

(73) Assignee: Hino Motors, Ltd., Tokyo (JP)

( * ) Notice: Subject to any disclaimer, the term of this patent is extended or adjusted under 35 U.S.C. 154(b) by 2266 days.

(21) Appl. No.: 11/569,821

(22) PCT Filed: Jun. 8, 2005

(86) PCT No.: PCT/JP2005/010459
§ 371 (c)(1),
(2), (4) Date: Mar. 22, 2011

(87) PCT Pub. No.: WO2005/121913
PCT Pub. Date: Dec. 22, 2005

(65) Prior Publication Data
US 2011/0163875 A1    Jul. 7, 2011

(30) Foreign Application Priority Data
Jun. 9, 2004    (JP) .................................. 2004-171427

(51) Int. Cl.
*G08B 21/00* (2006.01)
*B25B 21/00* (2006.01)

(52) U.S. Cl.
USPC ..... 340/540; 340/656; 340/686.4; 340/686.5; 29/407.01; 29/707; 29/714

(58) Field of Classification Search
USPC ........... 340/540, 656, 686.4, 686.5, 679, 680; 29/407.01, 707, 709, 714; 173/2, 11, 173/20, 180
See application file for complete search history.

(56) References Cited

U.S. PATENT DOCUMENTS

| 4,016,938 | A | * | 4/1977 | Rice ................................. 173/1 |
| 5,713,250 | A | * | 2/1998 | Hendricks et al. ................ 81/54 |
| H1821 | H | * | 12/1999 | Kosinski ....................... 173/180 |
| 6,055,484 | A | * | 4/2000 | Lysaght ......................... 702/41 |
| 2003/0009262 | A1 | * | 1/2003 | Colangelo et al. ............ 700/275 |
| 2004/0172800 | A1 | * | 9/2004 | Seith et al. ................. 29/407.01 |

FOREIGN PATENT DOCUMENTS

JP    2000-042874    2/2000

* cited by examiner

*Primary Examiner* — Hung T Nguyen
(74) *Attorney, Agent, or Firm* — Smith, Gambrell & Russell, LLP

(57) ABSTRACT

Errors in work in a bolt or nut tightening process are reduced to an extremely low level. Further, the process of the work is accurately recorded and quality of production processes is improved. A production management device receives information on a production instruction from a superordinate device, optically displays, according to the information, a socket to be selected for work to tighten a bolt or a nut, automatically recognizes a nut taken out from a socket holder, and alarms when the recognized socket and the displayed socket do not agree.

5 Claims, 3 Drawing Sheets

MANUFACTURING CONTROL DEVICE

TECHNICAL FIELD

The present invention is used in the process of assembly of mass-produced articles. Although the present invention was made to be used in the automobile manufacturing process, it is not limited to automobiles and can be used in the process of operations involved in continuous manufacture of a large number of products with identical specifications or slightly different specifications. The present invention relates to a device used for instructing an operator handling a large number of various bolts and/or nuts utilized in the manufacturing process to use the correct bolts and/or nuts that conform to the design specifications and to tighten them correctly using a tightening force that is in compliance with the respective design specifications, as well as for exercising control over whether operations are carried out as instructed.

BACKGROUND ART

A large number of bolts and nuts are used for attaching various devices and components in the process of manufacture and assembly of automobiles and other vehicles. When a bolt is attached to a device, during the manufacturing process, tightening is carried out by selecting a nut that matches the bolt. When a nut is secured to a device or when a screw thread is formed in a device, a bolt is selected to perform the tightening operation. In addition, when mounting holes are formed in a device or frame, bolts are inserted into these holes and tightening is carried out by selecting nuts that match the bolts. If necessary, washers are used by slipping them onto bolts. In any case, tightening has to be performed by correctly selecting bolts or nuts according to design specifications and using tightening torques that are in compliance with design specifications.

In recent years, vehicle production lines or vehicle production equipment have come to be used for the production of vehicles that are not necessarily of the same type. Nowadays, vehicles of different types with slightly different specifications are handled together on a single assembly/production line. The well-known "Kanban system" is used in such cases. The articles being processed, which move along a production line, are provided with "Kanban" or signboards showing details of their manufacturing specifications. By looking at the signboards of the successively arriving processed articles, i.e. work objects, operators in each work area can get information about their specifications and select components, bolts, nuts, etc., or apply different tightening torques depending on their specifications, as well as make other fine adjustments. This permits organized and continuous manufacture of products with correct specifications in a flexible, responsive manner even if the specifications of the products are partially different.

A device, in which a torque sensor and other sensors are attached to an electric driver and the outputs of the sensors are fed to a personal computer device, is described in Patent document 1 below as an example of a conventional device used for bolt or nut tightening during product assembly work. It is understood that such a device provides an operator with instructions based on product specifications and, at the same time, controls the electric driver. According to the description, in such a device, the personal computer also controls other things such as the number of screws and their tightening torques.

Patent document 2 listed below discloses a device which, along with controlling an electric driver via a personal computer, has a torque sensor attached to the electric driver and controls the number of screws to be tightened and the number of items to be tightened. In addition, as mentioned in the document, the quality of assembly is improved by referring to a workflow procedure stored in the personal computer in advance.

Patent document 3 listed below discloses a device that detects power currents supplied to electric tools and controls the number of operations performed by the electric tools by measuring the frequency with which the value of the power currents exceeds a constant value.

Patent Document 1: JP H6-47634A (Japanese Patent No. 2765385)
Patent Document 2: JP H11-129164A
Patent Document 3: JP2003-123050A

DISCLOSURE OF INVENTION

Problem to be Solved by the Invention

The Kanban system described above is an efficient system widely used in cases, wherein the specifications of the manufactured products are not necessarily the same. However, it is impossible to eliminate all operator errors and inaccuracies by using this system. To supplement it, various countermeasures are taken such as that a person other than the operator conducts rigorous product inspection and that clear directions regarding expected errors are issued.

Put together, the contents of the above-mentioned documents contain disclosures related to detecting the number of tightened bolts and nuts, collecting them in one place, detecting tightening torques, and providing instructions regarding the tightening torques and the number of tightening operations. However, none of the documents describes how to avoid errors in operation caused by selecting the wrong type of bolts or nuts in cases, wherein the types of bolts or nuts used vary depending on product specifications. In other words, the conventional technology described above is premised on the assumption that the production cycles of products with identical specifications are repeated during mass production and does not consider the issue of manufacture of products having slightly different specifications using the same manufacturing equipment.

On the other hand, the applicant of the present invention has been planning and testing the manufacture of products of a larger number of types than with the conventional technology using the same manufacturing equipment. In this connection, the applicant of the present invention disclosed a novel system of automotive assembly in a previous application (Japanese Patent Application No. 2004-66516, which has now published as JP2004-291954 and PCT/JP2004/003135 with the title of "Vehicle assembly method and assembly plant", which has now been published as WO2004/080785, and on which this US application is based, a corresponding application of which has now been filed in the USPTO as application Ser. No. 10/548,564). Unlike the well-known conventional system, in which vehicles assembled on a linear conveyor are moved all at once, in this system a single vehicle or a few vehicles are assembled on a rotary assembly stand. In other words, in the system of the previous application, the operations of supplying a plurality of components were directed towards one radial center and vehicles were assembled on a rotary assembly stand that had a plurality of supplied components provided in its radial center.

The system of the previous application, which utilized a rotary assembly stand, had an excellent feature, whereby a component remained in a workpiece state only for a very brief time after entering the process, which permitted a reduction in manufacturing costs. In addition, the system was useful in cases where it was necessary to produce vehicles with specifications that were slightly different from the standard specifications and, on the whole, permitted a reduction in the number of man-hours and the amount of work space required for assembly operations. The "Kanban system" used in the past can be effectively adapted for use in such a work process as well. In addition, in a vehicle assembly process based on this system, a few operators successively perform assembly operations involving different elements. Therefore, since the probability of an operator choosing wrong specifications for the selected tools or screws/nuts became more pronounced, it was realized that this issue had to be addressed.

The present invention was conceived with the above-mentioned background in mind, and it is an object of the invention to provide a control device useful in enabling the same operators to produce a plurality of products with different specifications using the same manufacturing equipment. It is an object of the invention to provide a manufacturing control device capable of reasonable handling of situations, in which diverse products are manufactured using the same manufacturing equipment. In particular, it is an object of the invention to provide a device that allows an operator to avoid errors in the selection of bolts or nuts whenever different types of bolts or nuts are used. Furthermore, it is an object of the present invention to provide a manufacturing control device capable of appropriately identifying errors in the choice of bolts or nuts selected in the steps preceding the tightening operation. It is an object of the present invention to provide a control device capable of tracing errors at a later time if operation errors do take place. Namely, it is an object of the present invention to expand the scope of specifications of products that can be produced using the same manufacturing equipment.

Means for Solving Problem

The present invention is characterized by comprising: means for receiving production instruction information from a higher-level device via a communications control system, means for displaying sockets to be selected for the operation of bolt or nut tightening in each particular process in accordance with the production instruction information, means for recognizing sockets removed from a socket holder, and means for generating an alert in case of a mismatch between sockets recognized by the recognizing means and sockets displayed by the displaying means. The production instruction information received from a higher-level device may be, for instance, information displayed on a signboard used in the so-called "Kanban system", or information obtained by translating the contents displayed on a signboard more specifically into the corresponding information for each work site. The term "sockets" relates to components mounted on the tips of electric or other power tools used for tightening bolts or nuts.

Namely, during such a manufacturing process, products of many types have to be manufactured according to the production instruction information without being limited to a single set of predetermined specifications, with the bolt or nut specifications varying depending on the specifications of the products, i.e. the work objects of the process. To provide an example, tightening operations performed on the same axle would involve different specifications for bolts or nuts used for a 4-ton vehicle and a 6-ton vehicle. For this reason, the sockets attached to the tips of the same tightening tools (e.g. electric drivers, pneumatic tools, etc.) will be different. Accordingly, a plurality of sockets are stored in a socket holder at the corresponding work site and the operator selects one of the sockets prior to the tightening operation and attaches it to the tip of a tightening tool. The device of the present invention makes it possible to select the correct sockets in accordance with specifications indicated by a higher-level device. The device of the present invention also makes it possible to identify errors made in operations performed in previous steps.

Now, as an example of a typical workflow, let us consider a situation, in which a bolt or nut subject to tightening in the manufacturing process has been attached and pre-tightened in the proper location during a previous step (including during component manufacture). If the bolt or nut selected and pre-tightened in the previous step has the correct specifications, the specifications of the socket that the operator will get from the socket holder of the inventive device will match the bolt or nut. Therefore, during the tightening process, the prescribed socket will be mounted on the tool and tightening will be performed according to specifications. Most regular operations are carried out successively in this manner.

However, let us suppose that the specifications of a bolt or nut selected and pre-tightened on the item being assembled in a previous step are different from the original specifications. In other words, let us consider a situation, in which an error has already been made in a previous step. At such time, if the operator looks at the actual bolt or nut already attached to the workpiece and gets a matching socket, the device of the present invention will generate an alert to let the operator know that it does not meet specifications. If the operator does not recognize the type of the pre-tightened bolt or nut, gets a socket from the socket holder in accordance with the instructions of the inventive device, and tries to use it to perform the tightening operation, the socket will not match the already pre-tightened bolt or nut. At such time, the operator will be unable to perform the tightening of the bolt or nut. As a result, the operator will become aware of an error in the selection of the bolt or nut in a previous step.

Although the operator can simply replace the pre-tightened bolt or nut with a bolt or nut having the correct specifications when the device of the present invention helps the operator discover an error made in a previous step, the problem can be addressed in various ways, which are different in nature from the objects and means of solution of the present invention. Care should be taken to avoid delays in working operations due to such replacement operations, as well as to prevent errors from occurring again, and the errors are handled in accordance with the respective predetermined working operation instructions (instructions).

The means for displaying the sockets to be used can be configured to include a lamp that lights up in the corresponding locations of the above-mentioned socket holder, in which the sockets to be used are contained. In addition, the means for generating an alert in case of a work instruction mismatch can be configured to include means for varying the colors displayed by the lamps that light up in the corresponding locations of the socket holder. Furthermore, the means for generating an alert in case of a mismatch preferably provides indication in locations recognizable to the operator, both in the socket holder locations and in the locations, where the bolt or nut tightening operation is performed.

The device can be configured as a history recording device comprising means for partially or entirely recording information regarding sockets removed from the socket holder, information regarding the usage of tools intended for use with the sockets, and information regarding the tightening torques used on nuts or bolts tightened using the tools in conjunction with timing information, as well as means for reading information recorded by the recording means.

Effects of the Invention

The present invention makes it possible to correctly select sockets mounted on tightening tools in accordance with manufacturing specifications. Even if an operator makes an error in selection, an alert is generated and the error can be corrected within a short period of time, i.e. within a period that does not affect the overall production tact time. The operator can confirm correct socket selection on the spot while performing operations using tightening tools. Furthermore, even if errors concerning the type of the pre-tightened bolts or nuts are made during steps preceding the tightening operation, they can be appropriately identified. Even if the operator does not notice an error and proceeds with the operation using an incorrect socket, the error can be traced back by reading the recorded information.

DESCRIPTION OF REFERENCE NUMERALS

1. Production Management device
2. Communication Line
3. Data Transfer Board
4. Communication Bus
5. Manufacturing Control Device
6. Control Panel
7. Socket Holder
8. Nutrunner
9. Indicator Lamp
10. Rotary Assembly Stand
11. Control Panel
12. Printer
13. Socket

BEST MODE FOR CARRYING OUT THE INVENTION

Figure 1:
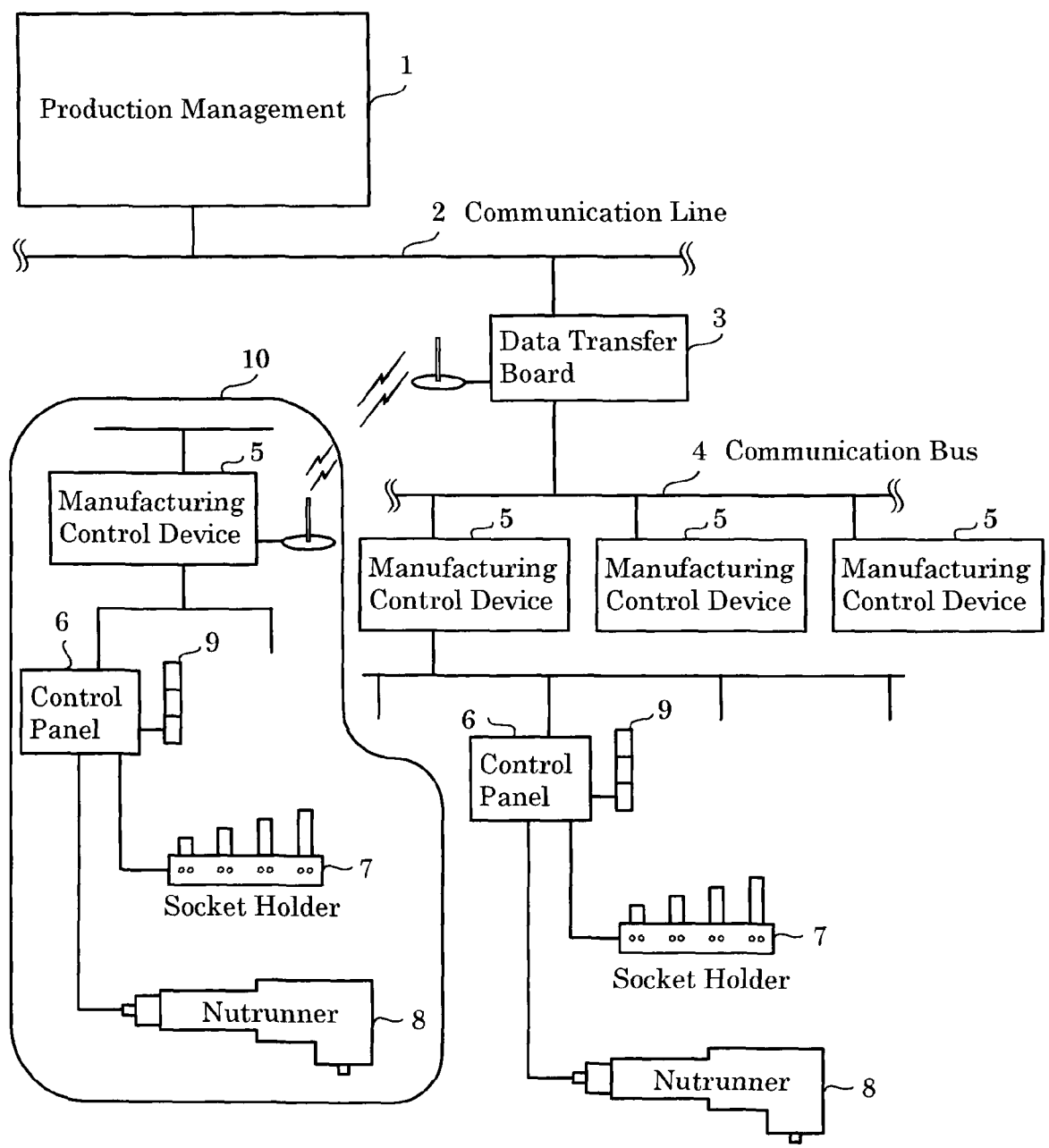
FIG. 1 shows a block diagram of an embodiment of this invention.

FIG. 1 is a general block diagram of the production management system including an embodiment of this invention. The production management device 1 is an information processing device exercising overall control over production management at the associated facilities, including the manufacturing facility where the present invention is implemented. The production management device 1 can be accessed whenever necessary from a plurality of authorized lower-level devices via a communication line 2. A production plan for vehicles manufactured using the associated manufacturing equipment is stored in the internal memory of the production management device 1. The data transfer board 3 is a device provided in each facility and used to exercise control over connection to the production management device 1. The present invention relates to manufacturing control devices 5, which are connected to the data transfer board 3 via a communication bus 4. A portion of the communication bus 4 is also connected to a manufacturing control device 5 installed on a rotary assembly stand 10 through a wireless connection.

In a nutshell, the rotary assembly stand 10 is the stand disclosed in the above-mentioned previous application, e.g. a disc with a diameter of several meters to tens and several meters. A single vehicle undergoing assembly is placed on this disc. The disc slowly rotates with the assembled vehicle on it. For example, it may perform a single rotation during a predetermined time (approximately one hour to one hour and a half). A plurality of component supply areas are provided in a nearly fan-like fashion on the floor of the rotary assembly stand along lines radially extending from its center to its periphery. As the rotary assembly stand rotates, components and units necessary for assembly are supplied onto the disc via these component supply areas. Several operators are engaged in assembly operations on the rotary assembly stand. As the assembly operations proceed, the operators perform various types of operations. In other words, they do not repeatedly perform predetermined operations every tact time that lasts a few minutes, as was the case under the conventional linear conveyor system. In addition, in each radially arranged component supply area, several operators are engaged in operations involving preparation of the supplied components. The device of this working example is used both for personnel performing operations on the rotary assembly stand 10 and for tools used in the radially arranged component supply areas.

A control panel 6 is connected to the manufacturing control device 5 through a communication line. The control panel 6 is placed in a plurality of locations used for performing bolt and nut tightening operations. The control panels 6 are positioned in locations readily visible to the operators on the floor. A socket holder 7 and a nutrunner 8 are connected to the control panel 6 via electric cables. One of the sockets held in the socket holder 7 is removed by an operator and mounted on the tip of the nutrunner 8. In addition, an indicator lamp 9 is provided in a readily visible location of the control panel 6. The indicator lamp 9 offers three-color indication, lighting up in "green", "yellow", or "red". Incidentally, "green" represents successful completion, "yellow" the start of operation, and "red" an abnormal stop.

A plurality of devices, such as a manufacturing control device 5, a control panel 6, a socket holder 7, a nutrunner 8, and an indicator lamp 9 are arranged on the rotary assembly stand 10 as well. The communication bus 4 used for connecting to the manufacturing control device 5 on the rotary assembly stand 10 uses a wireless connection as described above because a distribution cable would get twisted along with rotation if a distribution cable was used. It should be noted that power cables running to the work areas on the rotary assembly stand 10 are connected using separate rotary couplers. Detailed explanations are omitted here because this is a well-known technology.

Figure 2:
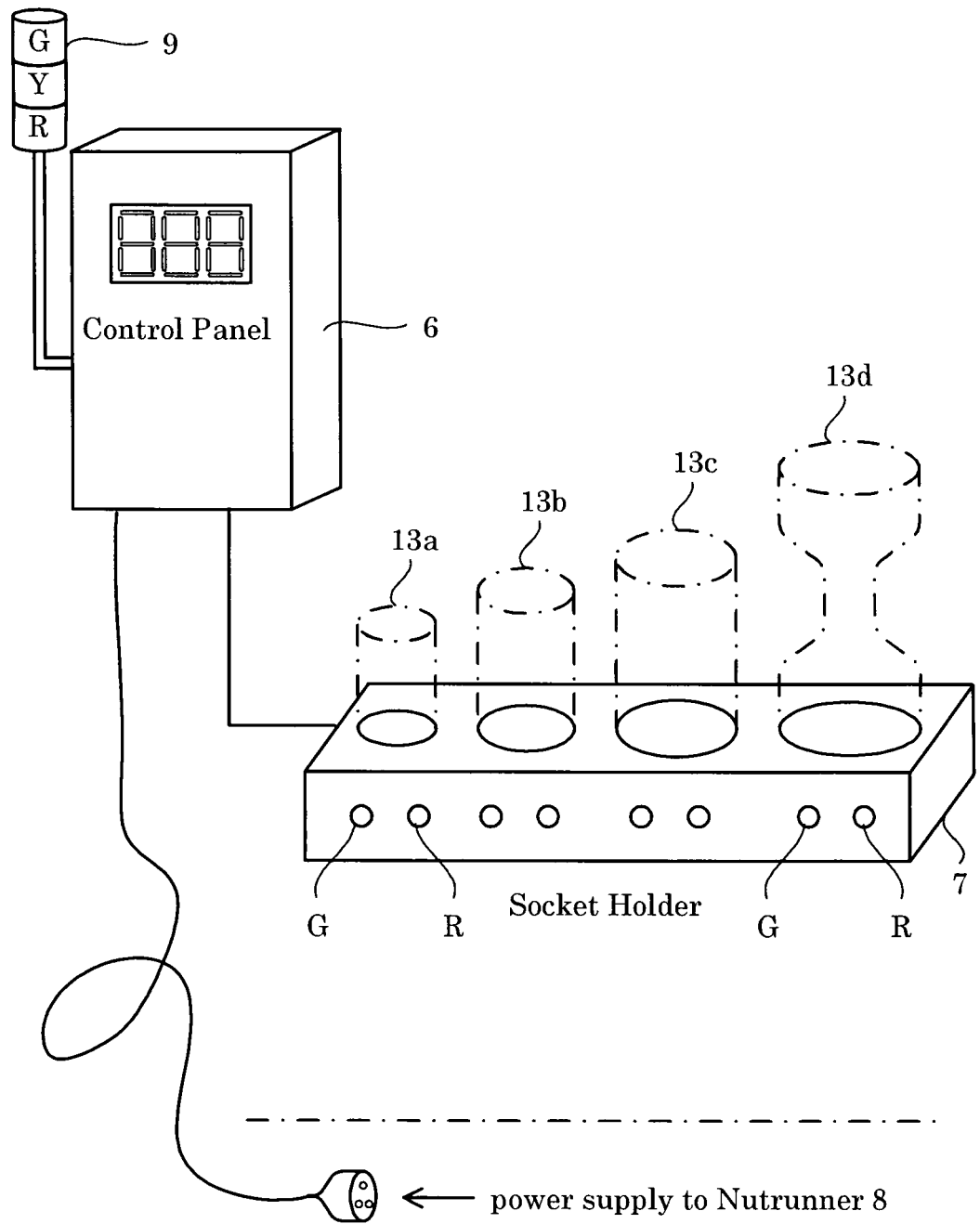
FIG. 2 shows a diagram used to explain a shop-floor configuration used in the embodiment.

FIG. 2 provides an example of a series of power plugs connected to the control panel 6, socket holder 7, indicator lamp 9, and nutrunner 8 (not shown). Numbers used for identifying work areas are displayed in digital form on the control panel 6. For each one of them, a single socket holder 7 is connected to the control panel 6. Sockets 13a-13d or the like used in the process can be placed in the single socket holder 7, which allows a maximum 4 different types of specifications. Recesses are formed in the locations where the sockets 13a-13d are placed and sensors are provided in the four recesses in order to electrically (or optically) sense whether the sockets 13a-13d have been inserted therein. In addition, pairs of green and red lamps light up in each of the socket locations of the socket holder 7.

Now, let us explain how the device works. As the working operations proceed, the next socket to be used at the work site is indicated with appropriate timing via control exercised by the control panel 6. The device performs indication in yellow (Y) using the indicator lamp 9 of the control panel 6 connected to the socket holder 7 located at the work site, in which the next socket to be used is contained. At the same time, a green (G) lamp lights up to indicate which of the plurality of sockets 13a-13d placed in the socket holder 7 has to be used. When the operator takes and removes the correct socket 13 from the socket holder 7, the green (G) lamp goes out and a yellow (Y) light on the indicator lamp 9 of the control panel 6 comes on. In this manner, the operator knows that the correct socket has been removed.

If at such time the operator takes a non-designated socket by mistake, the indicator lamp provided in its location on the socket holder 7 lights up in red (R) and, at the same time, the indicator lamp 9 of the control panel 6 also lights up in red (R). The indicator lamp 9 is positioned in a location that is readily visible from the working location and even if the operator does not notice the indicator lamp on the socket holder 7 and proceeds to the working location, s/he will be able to recognize the fact that a wrong socket has been removed.

As explained in connection with "Means for Solving the Problem" above, the device is also effective in cases, wherein bolts or nuts with incorrect specifications are pre-tightened in a previous step on an assembled vehicle subject to tightening operations. In other words, not only does it prevent errors in the corresponding steps, but it is also capable of discovering and correcting errors made in a previous step during the current step. The explanations for the logic behind it will not be repeated here.

Figure 3:
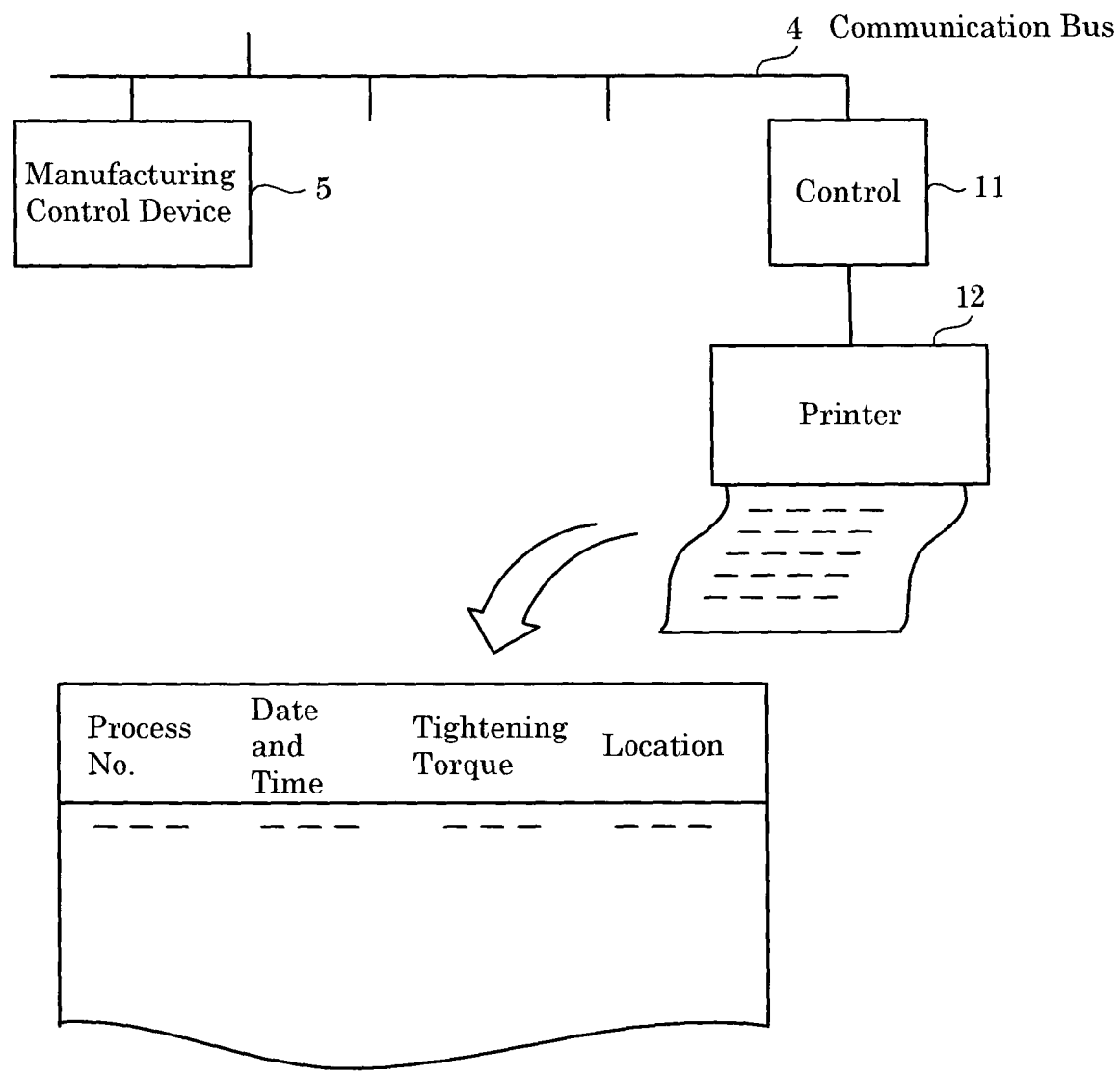
FIG. 3 shows a diagram explaining recording and readout in the embodiment.

Next, explanations are provided with respect to a configuration used when reviewing the contents of tightening operations already performed in the past with the device of the present invention with reference to FIG. 3. Namely, as explained above, when an operator uses a designated socket to perform bolt or nut tightening, the manufacturing control device 5 of the present invention is configured to automatically save a record of the tightening operation in its internal memory. In other words, the device of the working example is configured to automatically record information regarding sockets removed from the socket holder explained above, information regarding the usage of tools to be used with the sockets, and information regarding tightening torques used for nuts or bolts tightened using the tools in conjunction with process numbers, product numbers and timing information in its internal memory. In addition, whenever necessary, this information can be read through the control panel 11 connected to the communication bus 4 and printed out in the form of numeric tables on the printer 12 as appropriate. If a problem is recognized in the stage of product inspection or after product inspection, the manufacturing history of the product can be individually evaluated based on the contents of the printout. As a result, manufacturing process control can be carried out at an even higher level.

INDUSTRIAL APPLICABILITY

The working examples above provided explanations regarding a rotary assembly stand, but the concept of the present invention is limited neither to the system described in the working examples, nor to the manufacture and assembly of automobiles, and can be widely used for controlling the manufacture of various products including bolt or nut tightening steps.

The invention claimed is:

1. A manufacturing control device comprising:
   means for receiving production instruction information from a production management device in which a production plan for vehicles manufactured is stored,
   means for displaying sockets to be used for a next operation of tightening of bolts or nuts in accordance with the production instruction information as working operations of the production plan proceed according to predetermined timing,
   means for recognizing sockets removed from a socket holder, and
   means for generating an alert in case of a mismatch between sockets recognized by the recognizing means and sockets displayed by the displaying means.

2. The manufacturing control device according to claim 1, wherein the means for displaying the sockets to be used includes a lamp lighting up in the corresponding location of the socket holder, in which the socket to be used is contained.

3. The manufacturing control device according to claim 2, wherein the means for generating an alert in case of a mismatch includes means modifying the display color of the lamp lighting up in the corresponding location of the socket holder.

4. The manufacturing control device according to claim 1, wherein the means for generating an alert in case of a mismatch includes means for providing indication in positions recognizable to the operator both in the socket holder location and in the location where the operation of bolt or nut tightening is performed.

5. A history recording device comprising means for partially or entirely recording information related to a manufacturing control device in conjunction with timing information,
   wherein the manufacturing control device comprises means for receiving production instruction information from a production management device in which a production plan for vehicles manufactured is stored, means for displaying sockets to be used for a next operation of tightening of bolts or nuts in accordance with the production instruction information as working operations of the production plan proceed according to predetermined timing, means for recognizing sockets removed from a socket holder, and means for generating an alert in case of a mismatch between sockets recognized by the recognizing means and sockets displayed by the displaying means,
   wherein the information related to a manufacturing control device includes information regarding sockets removed from the socket holder, information regarding the usage of tools intended for use with the sockets, and information regarding tightening torques used on nuts or bolts tightened using the tools, and
   wherein the history recording device further comprises means for reading information recorded by the recording means.

* * * * *